United States Patent Office 3,550,478
Patented Dec. 29, 1970

3,550,478
TRANSMISSION SHIFT AND THROTTLE CONTROL
William H. Bechman, Morton, and Robert T. Krumtinger, Peoria, Ill., assignors to Westinghouse Air Brake Company, Peoria, Ill., a corporation of Pennsylvania
Filed Nov. 25, 1968, Ser. No. 778,656
Int. Cl. B60k 21/00; F01b 23/00
U.S. Cl. 74—847         13 Claims

ABSTRACT OF THE DISCLOSURE

A dual drive on a machine having a prime mover unit and a trailing unit, an engine mounted in each unit connectible through a transmission to propel the unit, the engines also connectible to supply power requirements of other devices on the machine including one (a generator) requiring such a major proportion of the output of one engine that it may be desirable to limit propulsion to the other engine during part of the cycle. One selector controls both transmissions and, for all but infrequent conditions, one pedal controls both engines. A pneumatic system controls the speed of both engines; for operation in one selector position, one engine runs at high idle to operate the generator and the other engine is operator-controlled to regulate vehicle speed, by automatically blocking speed control signals to the high-idle engine while its transmission is in neutral. In other selector positions, the automatic block is removed, connecting both engines for vehicle drive and controlling both engines synchronously by the one pedal. To minimize operator fatigue, engine speed control can be "locked in" by valve means to hold engine throttles at a desired engine speed. Such speed "lock" can be relieved by operator control of: the valve means, the brake, or the retarder. Full operator control is completed by: limiting vehicle drive to the front engine when desired, by operator use of a front engine throttle pedal; and by permitting individual throttle control of the two engines.

---

Figure 1:
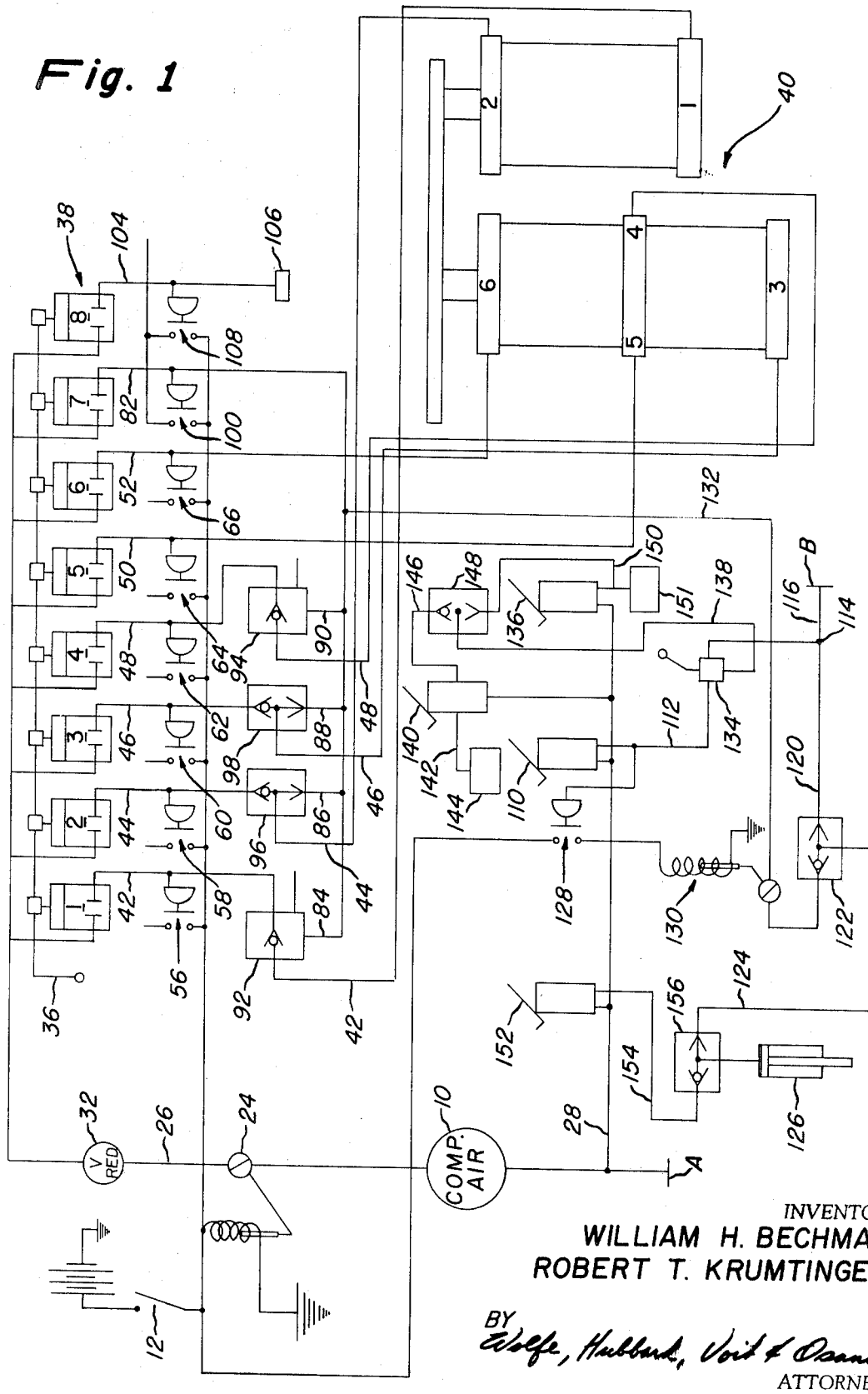

This invention relates to earth grading and moving equipment and, more particularly, to a unitary transmission shift and throttle cylinder control capable of simultaneously controlling two or more engines.

In earth moving or grading equipment, such as a scraper, a considerable load can be carried. This load may be large enough to prevent the loaded scraper from ascending a rise of, for example, as little as 12° or even less. It is accordingly conventional practice to employ a twin-engine drive with one engine located in the prime mover or tractor and the other on the trailing or scraper unit which carries the loaded earth.

Operating conventional equipment, the operator generally must utilize two pedals, one to modulate the throttle cylinder of each engine. The engines are desirably driven in synchronism, which is difficult to achieve because of the individual controls. Moreover, a substantial force must be employed to operate each of the pedals and operator fatigue often results with the concomitant decrease in efficiency.

Additionally, a typical problem with a self-loading scraper is that the elevator, employed to move the dirt, earth or other material from in front of the scraper blade into the bowl, cannot move the material as fast as it builds up in front of the blade when the scraper is moving at any speed near its optimum ground speed. The situation becomes particularly acute when a scraper load has reached a certain point, such as, for example, about 60% of capacity. At this point, the dirt accumulation is generally enough to significantly impair the efficiency of the loading elevator. Also, as the amount of piled-up material still to be loaded increases, the rim pull necessary to maintain a given ground speed increases; to avoid or correct that condition, it is desirable to relieve one engine of its vehicle propulsion burden to free it for elevator drive duty so that the material which has built up in front of the blade can be loaded quickly. Then, with the huge pile of material out of the way, the scraper is again free to move forward. With this invention, the operator can take the corrective action just indicated, but if he wishes he can also prevent such a pile-up of material by a control system which automatically relieves one engine of its wheel drive burden during loading. To accommodate to poor traction operation, the operator can drive all the wheels when necessary by selecting another operating position and reducing the depth of cut.

It is accordingly an object of the present invention to provide a transmission shift and throttle control for two or more engines which allows synchronous movement while retaining the ability to individually control the engines.

Another object of the present invention is to provide a control system of the above-identified type wherein the transmission shift control allows, in at least one position, the selection of a transmission range for one engine that is different from the other engine.

A further object of the present invention is to provide a control system of the above-described type wherein the engine throttle cylinders may be maintained at a desired extension without the necessity of continuous control by the equipment operator.

A still further object of the present invention is to provide a control system of the above-identified type wherein the throttle modulation control that is maintained may be automatically dissipated by operation of the brake pedal.

Another object of the present invention is to provide a control system of the above-identified type which includes a retarder for braking the throttle control.

Figure 2:
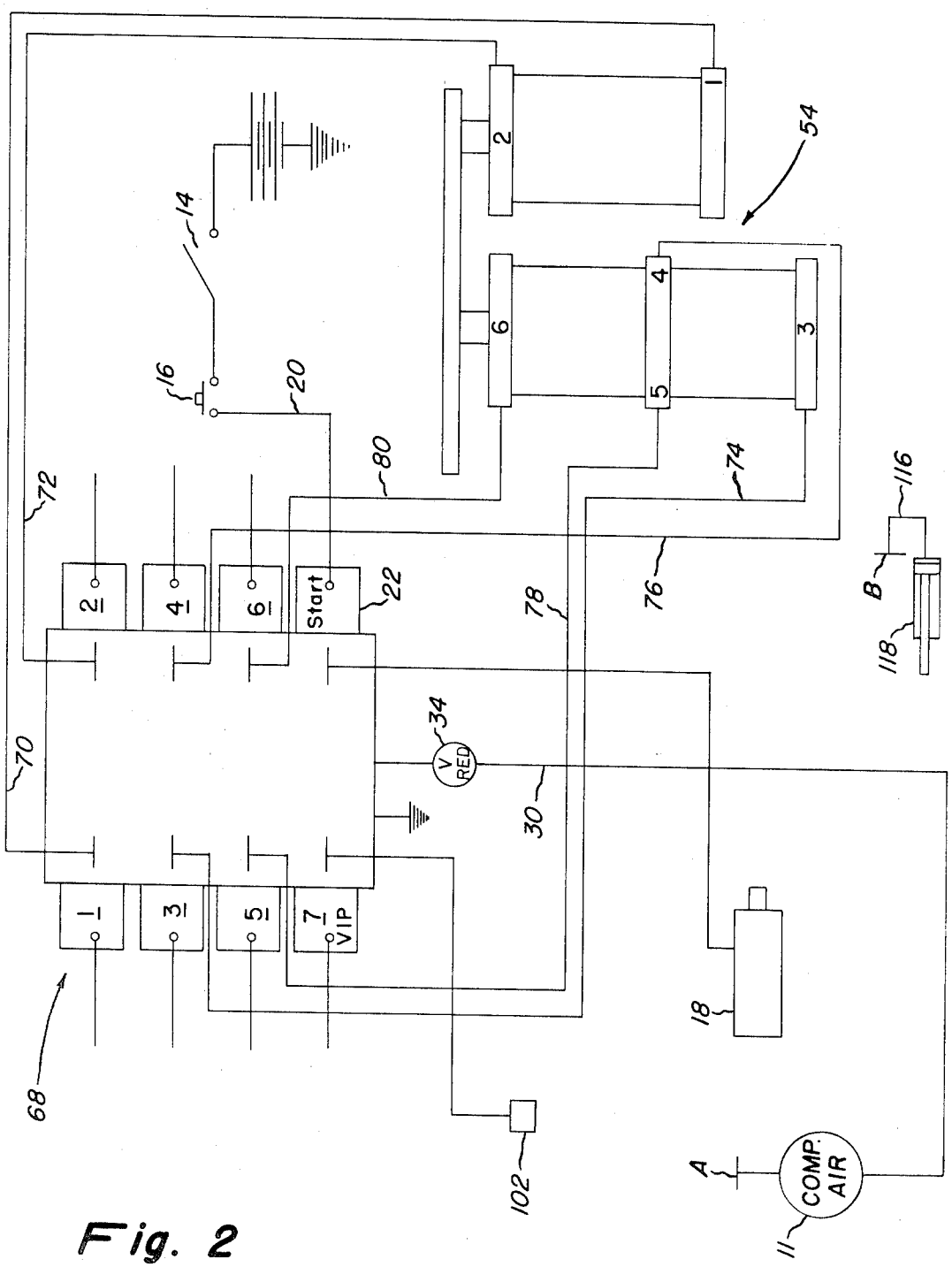

Other objects and advantages of the invention will become apparent as the following description proceeds, taken in conjunction with the accompanying drawings in which:

FIG. 1 is a schematic view of a portion of the exemplary embodiment of the transmisssion shift and throttle control system of the present invention and illustrating the control for the engine associated with a prime mover; and FIG. 2 is a schematic view of the remainder of the exemplary control system illustrated in FIG. 1 and showing the portion of the control system used in connection with the engine for the trailing unit.

While the invention is susceptible of various modifications and alternative forms, specific embodiments thereof have been shown by way of example and will hereinafter be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims. For example, while the invention will be described in connection with a self-loading scraper wherein the prime mover or tractor has one engine and the trailing or scraper unit has a second engine, it should be appreciated that the invention is equally applicable to any equipment where it is desired to simultaneously control the transmission shift and throttle cylinders of two engines. As an additional example, while the exemplary embodiment employs compressed air to provide pneumatic signals, it should be appreciated that any other signal source, such as other fluids, liquids and electricity could similarly be utilized.

In accordance with the present invention, a transmission shift and throttle cylinder control for simultaneously controlling at least two engines is provided which includes range selector means for selecting one of a plurality of positions to initiate, at each position, at least one selected signal from a first set of potential signals, a first set of transmission shift cylinders, means for transmitting certain of the initiated signals to the transmission shift cylinders, a single signal capable of being transmitted to a particular transmission shift cylinder, a second set of transmission shift cylinders, means for transmitting the initiated signals to a second set of transmission shift cylinders and means connected to at least one of the potential signals for initiating, in at least one range selection position, a pilot signal to block certain of the other initiated signals being transmitted to the first set of transmission shift cylinders while transmitting a signal to certain other of the first set of transmission shift cylinders whereby the range selected will be the same for both transmissions unless a range is selected which includes the pilot signal. In controlling the throttle cylinder of the two engines, there is included a first engine throttle cylinder, a second engine throttle cylinder, main throttle means for initiating a second signal, means for transmitting the second signal to the engine throttle cylinders, gate means interposed in the means connecting the second signal to the first engine throttle and means for transmitting the initiated pilot signal to the gate means, the gate means being capable of interrupting one of the signals while allowing the other to be transmitted to the first engine throttle cylinder whereby the throttle cylinders of the two engines operate synchronously unless the gate means permits the transmission of the pilot signal to the engine throttle cylinder.

In accordance with one feature of the present invention, the throttle control system includes an auxiliary throttle pedal or valve to initiate another signal that allows either the signal from the auxiliary valve or the signal emanating from the first gate means to pass to the first engine throttle cylinder. The auxiliary throttle valve may thus be actuated to modulate the first engine throttle cylinder independently of the second throttle cylinder.

Turning to the drawings, FIGS. 1 and 2 show an exemplary embodiment of the transmission shift and throttle control system of this invention for controlling a conventional twin engine, self-loading scraper. FIG. 1 illustrates the portion of the control for the prime mover unit and FIG. 2 the portion for the trailing unit. The pneumatic system shown is unitary and was divided solely for purposes of illustration. The figures are joined at the interfaces designated A and B.

A source of compressed air here shown as a storage tank 10 on the prime mover unit and a tank 11 on the trailing unit, may be used to initiate the various signals required by the system. The starting system is conventional and includes a switch 12 for the prime mover or tractor and a key switch 14, a starter button 16 and an air starter 18 for the trailer or scraper unit.

Typically, the starter switch 12 and the key switch 14 are closed. The starter button 16 is then pressed. An electrical signal is thus passed via line 20 to a solenoid 22 which in turn actuates the relay valve of the air starter 18 to permit air pressure to enter the starter main body. Solenoid valve 24 is thus opened and compressed air then can pass through line 26 to the selector (to be described). Line 28 is always open to tank 10 (FIG. 1) and line 30 (FIG. 2) is always open to tank 11. If desired, a reducing valve 32 can be placed in line 26 and a reducing valve 34 in line 30. This would allow a different pressure operating range for the transmission shift from that of the throttle control.

To select one of a plurality of positions in a transmission range, a transmission range selector is employed. A handle 36 of a conventional selector is shown. Selection of a particular range allows air to pass through one or more of the mechanically actuated pilot air valves, generally indicated at 38, and sequentially numbered 1 through 8. The transmission shift actuators or cylinders for the prime mover engine, generally indicated at 40, are also numbered from 1 to 6. Lines 42, 44, 46, 48, 50 and 52 allow the compressed air to pass from the pilot air valves 38 to the correspondingly numbered transmission shift cylinders 40. A second set of shift actuators or cylinders for the trailing unit transmission, indicated at 54, are numbered 1 through 6 to correspond to the prime mover transmission shift cylinders 40.

To allow control of the trailing unit engine by the transmission range selector for the prime mover, means are provided to transmit the signals initiated by the range selector to the trailing unit transmission shift cylinders. To this end, pressure switches 56, 58, 60, 62, 64 and 66 are interposed, respectively, in lines 42, 44, 46, 48, 50 and 52. When a pneumatic signal passes through one of these lines, the pressure switch activated by a relatively small pressure such as, for example, 2 p.s.i., interposed in the particular line makes contact and a signal is sent to a bank of solenoids, generally indicated at 68, and numbered 1 through 7. Solenoids 68 in turn activate the correspondingly numbered trailing unit transmission shift cylinders 54 by the signal passing through lines 70, 72, 74, 76, 78 and 80.

In accordance with one feature of the transmission shift control of the present invention, means are connected to at least one of the potential signals of the range selector for initiating, in at least one range selection point, a pilot signal that is capable of blocking certain of the other initiated signals being transmitted to the first set of transmission shift cylinders (i.e.—for the prime mover) while, at the same time, transmitting a signal to certain other of the first set of transmission shaft cylinders whereby the range for the first transmission may be different from the range for the other. Pilot air valve 7 of valve bank 38 is connected by line 82 and lines 84, 86, 88 and 90 to, respectively, intercept any pneumatic signals emanating from pilot air valves 1 through 4. Interposed in lines 84 and 90, respectively, are pilot air check valves 92 and 94 while shuttle valves 96 and 98 are similarly positioned in lines 86 and 88.

Thus, when a sequence of 1, 4, 6 and 7 is mechanically selected by the handle 36, the pneumatic signal from pilot air valve 7 passes through lines 84 and 90 to block the signals coming from pilot air valves 1 and 4. At the same time, the pilot signal from pilot air valve 7 passes through lines 86 and 88, into the shuttle valves and through lines 44 and 46 to provide a signal to shift cylinders 2 and 3, despite the fact that the range selector had not selected these signals. Pressure switches 42, 48 and 52 have actuated the solenoids 1, 4 and 6 for the trailing unit control so the correspondingly numbered trailing unit shift cylinders 54 are actuated. Pressure switch 100, in line 82, also activates solenoid 7 which in turn actuates a conventional variable input power assembly (VIP) 102 (FIG. 2). A suitable conventional assembly is shown in U.S. Pat. No. 3,358,444 to Tuck. This assembly is highly desirable, as is well known, for use when a scraper is being loaded. The prime mover transmission is thus in the range determined by positions 2, 3 and 6 while the trailing unit transmission is in the range corresponding to positions 1, 4, 6 and 7.

To provide a variable input power control for the prime mover, pilot air valve 8 is connected by line 104 to a variable input power assembly 106. Pressure switch 108 in line 104 is in parallel with pressure switch 100, so that when pilot air valve 8 sends a signal to actuate the variable input power control 106 for the prime mover, the variable input power control 102 of the trailing unit is also activated.

In accordance with still another feature of the present invention, there is provided a throttle control that permits one pedal to simultaneously control the throttle cylinders of the prime mover engine and the trailing unit engine. To this end, a main throttle valve and pedal 110 supply pneumatic pressure through a line 112 to a juncture indicated at 114. Line 116 permits the passage of compressed air, through interface B, to throttle operator or cylinder 118 for the trailing unit engine. Line 120 carries the compessed air to a shuttle valve 122 and then through line 124 to the prime mover throttle operator or cylinder 126.

To avoid racing the prime mover engine while the operator waits his turn to get into the cut, with the transmission range selector in the position normally used in the cut, and to prevent shifting the transmission for that engine from neutral into drive while the engine is at high idle with the equipment stationary, means are provided to keep the prime mover throttle in low idle position until the operator depresses the main throttle pedal to get his machine moving into the loading cycle. A pressure switch 128 is connected in line 112 to activate a solenoid valve 130 when the main throttle pedal 110 is depressed. This allows the pilot signal from pilot air valve 7 to pass through line 132 and into the shuttle valve 122, allowing the pilot signal to pass through valve 122 and line 124 to prime mover throttle cylinder 126. Shuttle valve or gate 156 will be discussed below.

To maintain a particular throttle cylinder modulation without continuously applying pressure, there is provided a means of automatically "locking in" a particular air pressure in the throttle cylinders. A conventional manual control 134, which operates as a three-way valve, is interposed in line 112. Movement of the valve 134 to one position prevents passage of air either to or from the throttle cylinders 118 and 126 to thus maintain the throttle cylinder extension that had been obtained by depressing the main throttle pedal. As a safety feature, a brake treadle valve and pedal 136 is connected to valve 134 via a line 150, a gate 148, and a line 138. A brake is shown schematically at 151. When the brake pedal is depressed, valve 134 is moved to a second valve position which permits the air in the throttle cylinders to exit through the main throttle valve 110.

If desired, additional pedal means may be included so the operator can retard or brake the transmission. As shown, a retarder treadle valve 140 is connected by line 142 to a conventional retarder 144. Line 146 connects the retarder treadle valve to shuttle valve or gate 148.

In accordance with still another feature of the present invention, there is provided a means of controlling the prime mover throttle cylinder independently of the trailing unit throttle cylinder. This allows the operator to individually modulate the throttle cylinders of the two engines in situations such as, for example, where the scraper moves around a curve and it is thus necessary that the wheels of the prime mover unit move at a faster rate than the wheels of the trailing unit. To this end, there is provided an auxiliary throttle valve and pedal 152, connected by line 154 to a shuttle valve 156, which serves, in effect, as a second gate. When the pressure exerted on the auxiliary throttle pedal is greater than the pressure on the main throttle pedal, gate 156 will block the pneumatic signal from the main throttle pedal 110 and allow the signal from the auxiliary throttle pedal 152 to pass to the prime mover throttle cylinder 126.

The advantages of the transmission shift and throttle cylinder control of the present invention can be illustrated in connection with the operation of a twin engine self-loading scraper. As illustrated, the transmission range is a ten position quadrant with the sequence for the two transmissions being the same for each selected position except when the selected position includes actuation of pilot air valve 7. When an unloaded scraper begins taking a cut along the surface being graded, the operator will generally be using only the main throttle valve 110 so that the prime mover and the trailing unit will be synchrously modulated. This allows the operator to control both engines with only half of the force that is conventionally required when individual controls are provided.

When the scaper load reaches the point at which the elevator efficiency begins to diminish because of the pile-up of material in front of the scaper blade, the operator can shift into a load position that activates pilot air valves 1, 4, 6, and 7. Pilot air valve 7 serves as a pilot signal and allows the transmission range of the trailing unit to be in the first position with variable input power; note FIG. 2 and valve 7 of the valve bank 68 and its connection with VIP assembly 102. At the same time, the sequence of the prime mover transmission is shifted to that corresponding to a neutral position (as illustrated 2, 3 and 6). The main throttle pedal 110 is depressed, whereupon pressure from line 112 closes pressure switch 128 and solenoid 130 is energized. The immediate effect is to transmit a pilot signal through line 132, gate 122, line 124, and gate 156 to throttle cylinder 126 of the prime mover engine, with the result that the prime mover engine runs at high idle.

In this position, the rim pull for maintaining the forward movement is obtained from the rear engine while the pilot signal maintains the prime mover throttle cylinder at its full extension. With the prime mover engine operating at idle, the electrical output of the generator unit is correspondingly maximized. The motor driving the elevator unit can thus receive the power that would otherwise be diverted to the prime mover wheels, and can accordingly receive maximum electric power. This allows the elevator to achieve its most effective operation.

When the dirt buildup has been decreased to the extent desired, the transmission range selector can then again be operated to move the control to another position that will allow simultaneous control of the two engines. If the scraper must negotiate a sharp turn, the operator can if he wishes individually control the two engines by using the auxiliary throttle pedal 152 as aforesaid to allow modulation of the prime mover throttle cylinder while the throttle cylinder of the trailing unit engine is being modulated by the main throttle pedal.

We claim as our invention:

1. A transmission shift and throttle control for simultaneously controlling at least two transmissions and engines which comprises selector means for selecting one of a plurality of positions to initiate at each position at least one selected signal from a first set of potential signals, a first set of transmission shift actuators, means for transmitting certain of the initiated signals to said transmission shift actuators, means capable of transmitting a single signal to a particular transmission shift actuator, a second set of transmission shift actuators, means for transmitting the initiated signals to said second set of shift actuators, means connected to at least one of the potential signals for initiating, in at least one selected position, a pilot signal to block certain of the other initiated signals being transmitted to the first set of shift actuators while transmitting a signal to certain other of the first set of shift actuators, a first engine throttle operator, a second engine throttle operator, main throttle means for initiating a second signal, means for transmitting the second signal to said first and second engine throttle operators, gate means interposed between the main throttle means and the first engine throttle operator, and means for transmitting the pilot signal to said gate means, said gate means capable of interrupting one of the signals while allowing the other to be transmitted to said first engine throttle operator.

2. The transmission shift and throttle control of claim 1 wherein the first set of potential signals and the second signal are pneumatic.

3. A transmission shift control for simultaneously controlling at least two transmissions and engines which comprises selector means for selecting one of a plurality of positions to initiate at each position at least one selected signal from a plurality of potential signals, a first set of transmission shift actuators, means for transmitting certain of the initiated signals to said shift actuators, means capable of transmitting a single signal to a particular shift actuator, a second set of transmission shift actuators, means for transmitting the initiated signals to said second set of shift actuators, and means connected to at least one of the potential signals for initiating in at least one selected position a pilot signal to block certain of the other initiated signals being transmitted to the first set of shift actuators while transmitting a signal to certain other of the first set of shift actuators.

4. The transmission shift control of claim 3 wherein the means for initiating a pilot signal includes pilot air valves positioned to intercept certain initiated signals being transmitted to the first set of transmission shift actuators, shuttle air valves positioned to intercept other potential signals to the first set of shift actuators and means for transmitting the pilot signal to said pilot air and shuttle valves, said pilot air and shuttle valves preventing the passage therethrough of any of the potential signals and said shuttle valves permitting the pilot signal to pass therethrough and be transmitted to the respective transmission shift actuator of the first set.

5. The transmission shift control of claim 3 wherein the means for transmitting the initiated signals to said second set of transmission shift actuators includes pressure switch means activated by the initiated signals and solenoid means actuated by said pressure switch means, said solenoid means capable of transmitting a signal to a shift actuator of the second set corresponding to the shift actuator of the first set to which the initiated signal is transmitted.

6. The transmission shift control of claim 3 which includes a variable input power control and means for transmitting one of the potential signals, when initiated, to said power control.

7. A throttle control for allowing synchronous or individual control of the throttle operators of at least two engines which comprises a first engine throttle operator, a second engine throttle operator, main throttle means for initiating a first signal, means for transmitting said first signal to said first and second engine throttle operators, means for initiating a second signal, gate means interposed between the main throttle means and the first engine throttle operator and means for transmitting the second signal to said gate means upon actuation of said main throttle means, said gate means capable of interrupting one of the signals while allowing the other to be transmitted to said first engine throttle operator.

8. The throttle control of claim 7 which includes an auxiliary throttle means for initiating a signal, a second gate means interposed between the signal emanating from said auxiliary throttle means and the signal transmitted through said first gate means, said second gate means capable of interrupting one of the signals while allowing the other to be transmitted to said first engine throttle operator.

9. The throttle control of claim 7 which includes valve means interposed in said means for transmitting the first signal to said first and second engine throttle operators and capable of being actuated to maintain said throttle operators at the first signal.

10. The throttle control of claim 9 which includes brake means connected to said valve means for dissipating the signal maintained by said valve means by actuation of said brake means.

11. The throttle control of claim 10 which includes retarder actuating means capable of initiating a signal, a retarder, means for transmitting the initiated signal to said retarder, shuttle valve means, means transmitting the initiated signal to said shuttle valve means, and means to transmit the signal emanating from said shuttle valve means to the first-named valve means.

12. The transmission shift and throttle control of claim 1 which includes blocking means to interrupt the transmission of the pilot signal to the gate means and means to render said blocking means ineffective upon actuation of said main throttle means.

13. The transmission shift and throttle control of claim 1 which includes an auxiliary throttle means for initiating a signal, a second gate means interposed between the signal emanating from said auxiliary throttle means and the signal transmitted through said first gate means, said second gate means capable of interrupting one of the signals while allowing the other to be transmitted to said first engine throttle operator.

References Cited

UNITED STATES PATENTS

| | | | |
|---|---|---|---|
| 2,233,188 | 2/1941 | Ward | 180—77X |
| 2,324,542 | 7/1943 | Schon | 180—77X |
| 2,464,636 | 3/1949 | Eaton | 60—97 |
| 2,666,295 | 1/1954 | Stevens | 60—97 |
| 2,737,272 | 3/1956 | Freeman | 192—3 |
| 3,339,658 | 9/1967 | Peterson | 180—77X |

MARK NEWMAN, Primary Examiner

T. C. PERRY, Assistant Examiner

U.S. Cl. X.R.

60—97; 74—473, 733; 180—77; 192—3